July 30, 1946.　　　G. R. ANDERSON　　　2,404,937
SYSTEM OF CONTROL FOR PULVERIZER MILLS
Filed Nov. 25, 1943
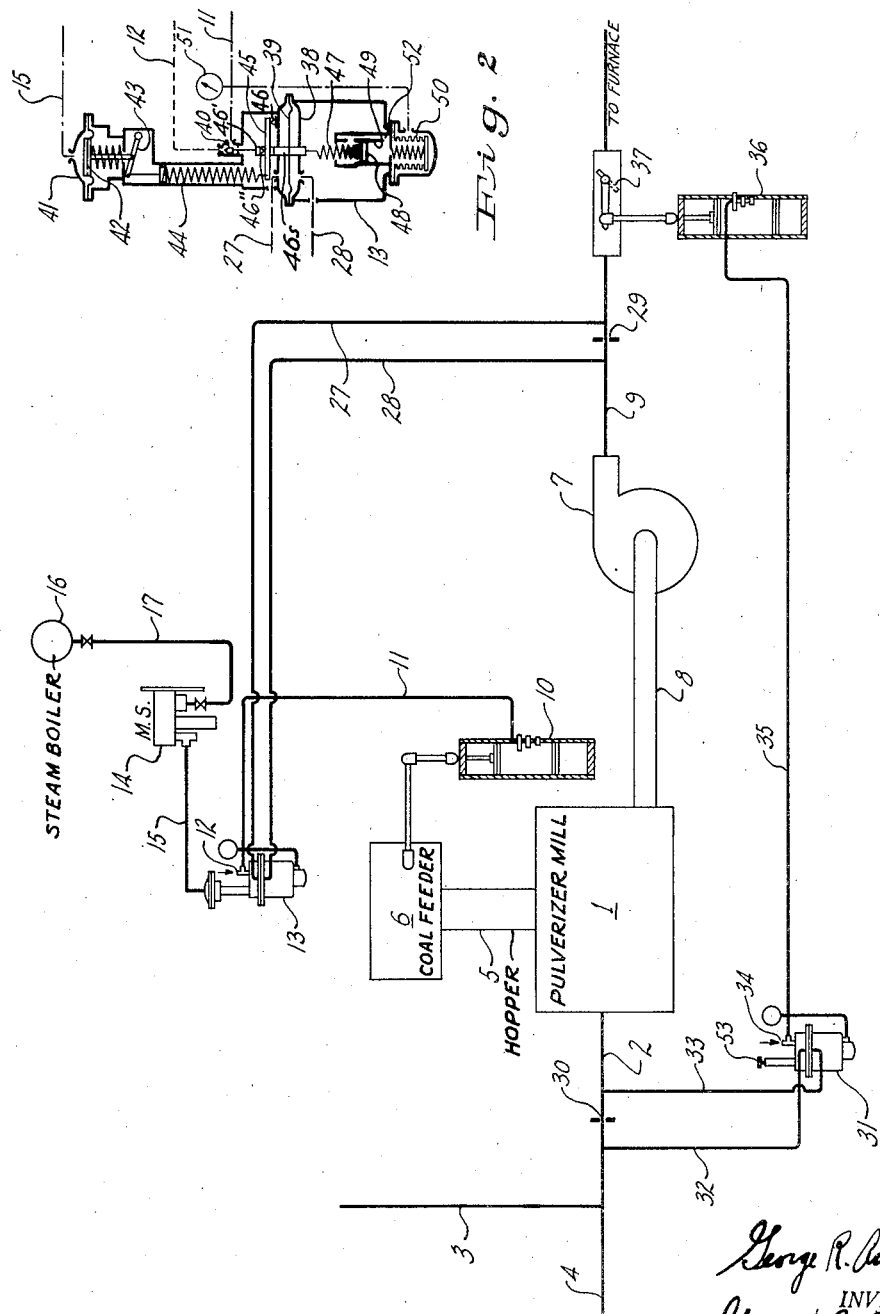

Patented July 30, 1946

2,404,937

UNITED STATES PATENT OFFICE 2,404,937

SYSTEM OF CONTROL FOR PULVERIZER MILLS

George R. Anderson, Mount Lebanon, Pa., assignor to John M. Hopwood, Mount Lebanon, Pa.

Application November 25, 1943, Serial No. 511,685

3 Claims. (Cl. 110—103)

This invention relates to pulverizer mills for steam boilers more particularly to a system of control for regulating the fuel output of a pulverizer mill in accordance with the load requirements of the boiler as determined by a master impulse.

It is among the objects of the invention to provide a control system for pulverizer mills in which the flow of air into the mill is held constant for every load on the boiler.

It is a further object of the invention to provide a system of control for pulverizer mills in which the flow of air and coal in suspension is regulated by controlling the rate of feed of coal to the pulverizer in accordance with a controlled pressure differential across a portion of the mill in which the coal and air are mixed.

These and other objects of the invention will become more apparent from a consideration of the accompanying drawing forming a part hereof in which like reference characters designate like parts, and in which;

Fig. 1 is a diagrammatic view of a control system for pulverizer mills embodying the principles of this invention; and Fig. 2 is a diagrammatic view of an airflow regulator.

With reference to the several figures of the drawing, the numeral 1 designates a pulverizer mill to which air is supplied by the line 2 from a source of preheated air supply 3 and tempering air 4. Coal is fed to the pulverizer mill through hopper 5 by a coal feeder 6 and the combined air and pulverized coal is drawn from the mill 1 by an exhauster 7 through the fuel line 8 extended at 9 for delivery to the furnace (not shown) as indicated.

The coal feeder 6 is actuated by a piston operator 10 to which pressure fluid is delivered by line 11 from a source of constant air pressure supplied at 12 to a regulator 13. Regulator 13 functions in response to an impulse received from a master sender 14 through line 15 in a diaphragm chamber which is more clearly shown in the large diagrammatic illustration of the regulator in Fig. 2 of the drawing. The master sender 14 is operative in response to variations in the steam pressure of a boiler 16 to which it is connected by line 17. The regulator 13 is connected by lines 27 and 28 across an orifice 29 of the fuel line for a purpose to be hereinafter explained.

A flow orifice 30 is provided in the air inlet line 2 and a flow regulator 31 is connected across orifice 30 by lines 32 and 33. The regulator 31 is connected at 34 to a source of constant pressure designated by the arrow and is capable of transmitting a sending pressure through line 35 to a damper operator 36 which operates damper 37 in the fuel line for a purpose hereinafter explained.

The flow regulator 13 for the coal feed operator 10 may be the type shown in Fig. 2 and consists of a diaphragm chamber 38 in which a diaphragm 39 is exposed to a pressure differential as determined by pressures in lines 27 and 28. A valve 40 is operated by the diaphragm 39 to control the application of a sending pressure from a constant pressure source 12 designated by the arrow Fig. 1, to the sending line 11. The operation of the diaphragm 39 is controlled by the loading pressure transmitted to a diaphragm chamber 41 by the master sender through line 15. A diaphragm 42 in chamber 41 operates a lever 43 which varies the pressure on a coil spring 44 that is connected with a beam 45 fulcrumed at 46. Diaphragm 39 is operatively connected to beam 45 by a yoke 46' having a knife edge 46'' resting on the top face of the beam, and a stem 46s. The stem of valve 40 rests on yoke 46'. A helical spring 47 is attached to the lower part of the diaphragm stem, the other end of the spring is attached to a piston 48 which moves freely in an oil cylinder 49. The body of oil in the cylinder extends to the space enclosed by the bellows 50 which is connected to a pressure gauge 51. An oil by-pass 52 is provided to allow the oil to flow around the piston 48 so that it gradually returns to its normal position, thereby releasing tension in spring 47.

The regulator 31 is constructed like the regulator 13 described in connection with Fig. 2 except that in the loading diaphragm 42 a spring loader is provided which consists of an adjustable thumb screw 53 which is attached to the coil spring 44 to vary the tension of the spring and thereby pre-set the load on diaphragm 39. With this construction a predetermined pressure drop may be maintained across orifice 30 of the air inlet line.

In the operation of the above described system of control for pulverizing mills regulator 31 is set by thumb screw 53 to maintain a given pressure drop or differential across orifice 30 by adjusting damper 37 to the desired position thereby maintaining a constant volume of airflow through the pulverizer mill 1.

A steam boiler is customarily so operated that the boiler steam pressure remains substantially constant for all rates of steam demand. Where automatic combustion control apparatus is employed to control the fuel and air delivered to the boiler, the apparatus is set to maintain a given steam pressure P at half-load or rating so that the apparatus will have steam pressure changes from half-load to full-load, or half-load to no-load to cause it to function. At full-load, the steam pressure will drop to $P_{FL}$ and at no-load it will rise to $P_{NL}$. A departure in steam pressure from the normal value, say P, is an indication that the combustion rate must be modified—thus if the steam pressure decreases, more fuel and air must be supplied—i. e., the combustion rate must be increased to cause the rate of steam generation to equal the rate at which it is consumed. If the steam pressure is increasing, that indicates that the demand for steam is decreasing and that steam is being generated at a higher rate than it is being consumed, therefore, the combustion rate must be decreased by decreasing the rate at which air and fuel are supplied to the boiler. Master sender 14 responds to steam pressure variations and changes the control point of regulator 13 by loading diaphragm 42 and causing the regulator to control delivery of coal to the furnace at such a rate that a definite value of pressure drop across orifice 29 is maintained for each value of loading of diaphragm 42.

In response to variations in the steam pressures of the boiler 16 which is fired by the fuel supplied to the furnace, the master sender 14 calls for more or less pressure drop in the orifice 29 and more or less coal must be fed by the coal feeder 6 to the pulverizer mill 1 to satisfy the change in the pressure differential required to be maintained across the orifice 29. It is a well known law of flow that at constant volume the pressure drop across an orifice increases directly with increased density of the flow medium, consequently if there is an increase of the coal fed to the pulverizing mill the combined air and pulverized coal will be denser resulting in a decrease of the pressure drop in the air supply line orifice 30. Regulator 31 which is pre-set by the loading spring adjustment 53, will respond to the decrease in the pressure differential across orifice 30 and transmit a sending pressure through line 35 to the operator 36 to increase the opening of the damper 37 until the volume of air flowing through orifice 30 into the mill will again be normal.

When the pressure drop across the fuel line orifice 29 as called for by the master sender 14 has been satisfied by the feeding of coal to the pulverizer mill, the fuel supply to the furnace will remain constant until there is a change in steam pressure of the boiler which will again vary the operation of the coal feeder and the airflow regulator will again operate in response to a pressure drop in the air line orifice 30 to adjust damper 37 to maintain a constant drop across the orifice 30 and supply a constant volume of air for which regulator 31 has been pre-set.

In this manner the flow of air to the pulverizer mill 1 is held constant for every load on the boiler as determined by the master sender 14.

It is evident from the foregoing description of this invention that a coal pulverizer may be operated by simple flow regulator controls to maintain a fuel supply to a furnace in accordance with the demand for steam on the boiler.

Although one embodiment of the invention has been illustrated and described it will be evident to those skilled in the art that various modifications may be made in the details of construction without departing from the principles herein set forth.

I claim:

1. In a boiler furnace a pulverizing mill, a system of control for regulating the air supplied to the mill comprising a flow orifice in the air supply line and a damper in the combined fuel and air delivery line, an operator for said damper and an air flow regulator for said operator, said regulator being connected across the air inlet orifice and being set to maintain a constant pressure drop across said orifice by adjustment of said damper.

2. In a boiler furnace a coal pulverizing mill, a coal feeder therefor, an air inlet and a combined air and fuel outlet for said mill, a flow orifice in said inlet and outlet, a damper in the outlet and a flow regulator responsive to the pressure drop across said air inlet orifice to regulate the damper in accordance with variations in the density of the combined air and fuel delivered by the mill as determined by the pressure drop across said outlet orifice.

3. In a control system for a pulverizer mill supplying coal to a steam boiler, said mill being provided with a coal feeder, an operator for actuating the feeder to adjust the rate of feed of coal to the mill, an air supply line for the mill, and an exhauster line therefor, said system comprising an orifice in the air supply line, a damper in the exhauster line, an operator for actuating said damper, a regulator responsive to the pressure drop across the orifice in said supply line for so controlling the damper operator that a substantially constant pressure drop is maintained across said supply line orifice, an orifice in the exhauster line ahead of said damper, a regulator responsive to the pressure drop across said exhauster line orifice for so controlling the coal feeder operator that rate of feed of coal to the mill is such that the pressure drop across the exhauster orifice is maintained substantially constant at a predetermined value for any established steam demand on the boiler, and a master sender responsive to steam pressure of the boiler for so loading said coal feed regulator that for each value of steam demand on the boiler the rate of coal feed is controlled to maintain a pressure drop across the exhauster orifice substantially constant at a value corresponding to the steam demand.

GEORGE R. ANDERSON.